May 22, 1962 P. O. BERG 3,035,739
FEED MILL
Filed April 28, 1958 2 Sheets-Sheet 1
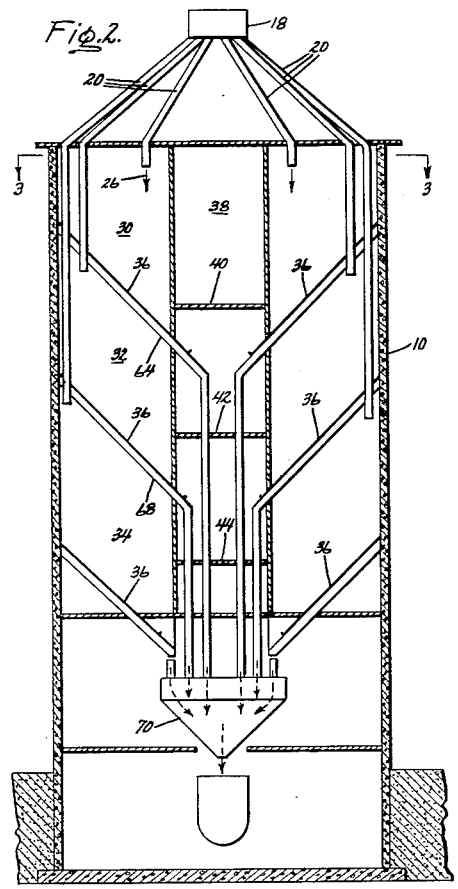
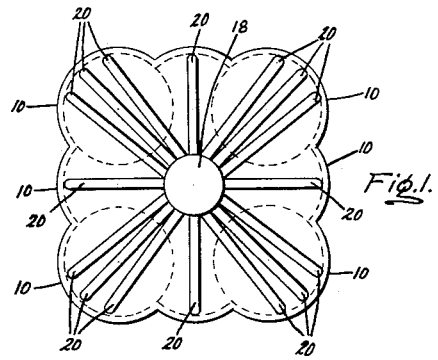
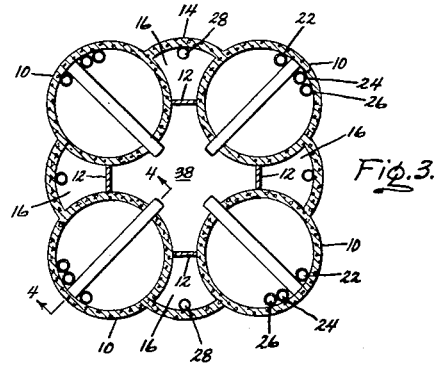
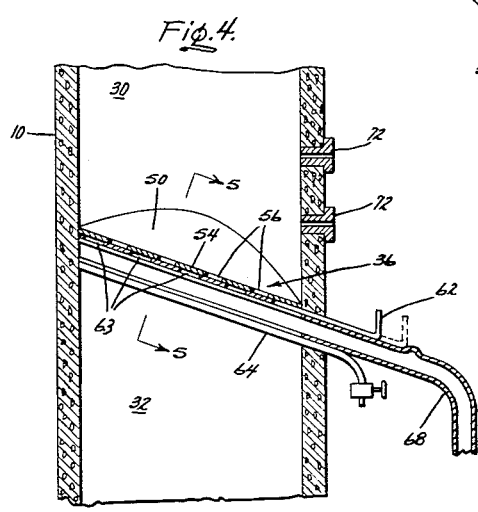
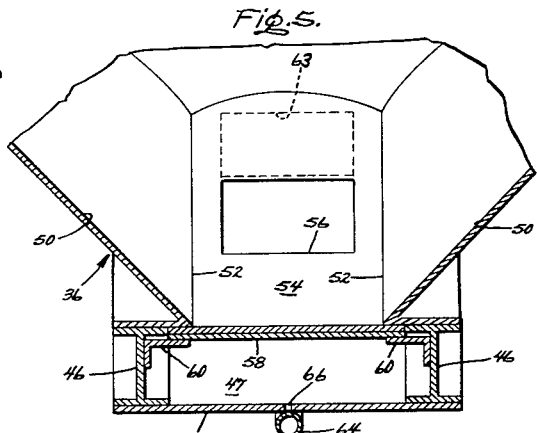
Inventor:
Paul O. Berg,
by Just & Trish
Attorneys.

May 22, 1962 P. O. BERG 3,035,739
FEED MILL
Filed April 28, 1958 2 Sheets-Sheet 2
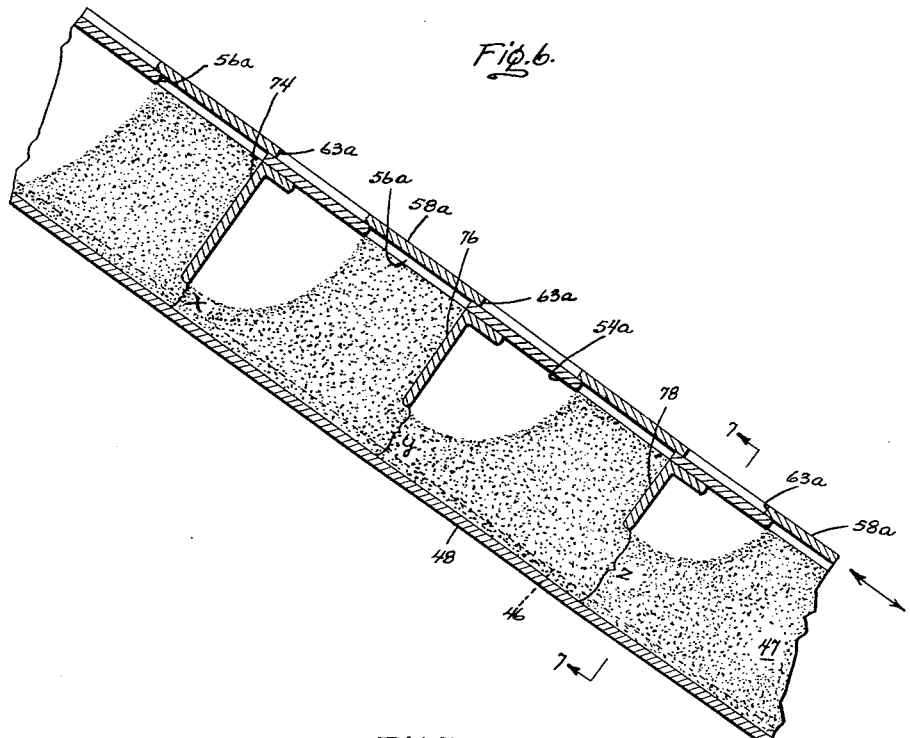
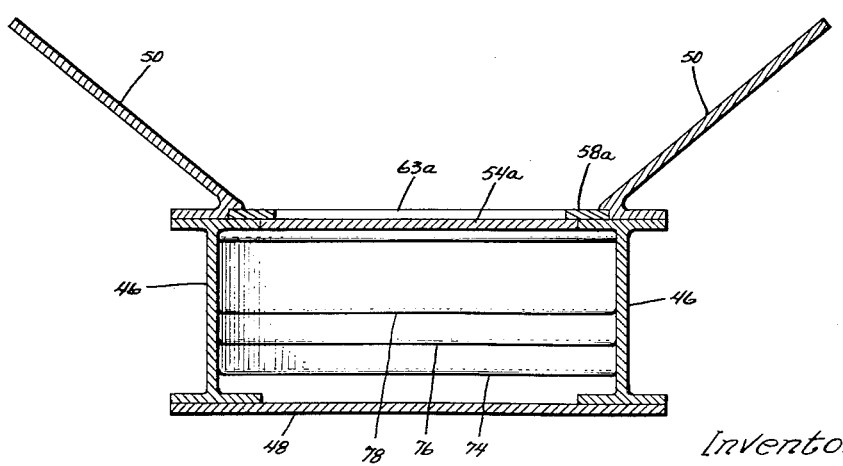
Inventor:
Paul O. Berg,
by Gust & Diehl
Attorneys.

_United States Patent Office_ 3,035,739
Patented May 22, 1962

3,035,739
FEED MILL
Paul Oliver Berg, 406 Transfer Bldg., Fort Wayne, Ind.
Filed Apr. 28, 1958, Ser. No. 731,396
11 Claims. (Cl. 222—135)

The present invention relates to feed mills and more particularly to a feed mill for storing, handling and preparing various kinds of feeds.

Feed mills are relatively large and expensive installations and for this reason must handle great quantities of material which are usually delivered in railroad car lots, if any kind of economy and efficiency are to be realized. However, the feed industry is following a trend to smaller plants which may be serviced by truck rather than by railroad, these smaller plants serving smaller areas than the larger ones.

In the larger plants, it is customary to use enormous, upright storage bins of either square or cylindrical shape, and this being true, economy and efficiency require that the bins be used substantially continuously in their entire capacity. Half use of a bin, either as to quantity or frequency of use, obviously does not utilize the total installation to its most efficient capacity. The smaller operations obviously cannot afford these more common, larger plant designs, and even further, the smaller plants must have facilities available to handle either large quantities of the same material or smaller quantities of many different materials simultaneously. Thus, smaller plants must possess greater flexibility of usage than the larger ones in order to be competitive.

Since the general configuration of both the larger and smaller plants cannot differ appreciably, both serving the same end purpose, it is necessary to provide means internally of the smaller plants which will permit the maximum use of the total storage space. In accomplishing this, it is necessary to keep the initial cost as well as the operating cost to a minimum.

It is an object of this invention to provide a feed mill which is comparatively inexpensive to construct and is both economical and efficient in operation.

It is another object of this invention to provide a feed mill having a plurality of storage bins which may be used collectively or individually to handle either large quantities of a single material or small quantities of many different materials.

It is yet another object of this invention to provide a design of feed mill capable of handling economically and efficiently different feed materials and dispensing these materials in a manner which requires a minimum of labor with a minimum of equipment.

Still another object of this invention is to provide in a feed mill a mechanism for providing gravity flow of material from the feed mill in such a manner as to minimize the tendency of the material to become bridged or packed in the mill.

Other objects will become apparent as the description proceeds.

To the accomplishment of the above and related objects, the invention may be embodied in the forms illustrated in the accompanying drawings, attention being called to the fact, however, that the drawings are illustrative only, and that specific change may be made in the specific constructions illustrated and described so long as the scope of the appended claims is not violated.

In the drawings:

FIG. 1 is a diagrammatic illustration in top plan view of one embodiment of this invention;

FIG. 2 is a vertical section thereof in diagrammatic form;

FIG. 3 is a cross-section taken substantially on section line 3—3 of FIG. 2;

FIG. 4 is a fragmentary vertical section taken substantially on section line 4—4 of FIG. 3;

FIG. 5 is a fragmentary sectional illustration taken substantially along section line 5—5 of FIG. 4;

FIG. 6 is a fragmentary view in longitudinal section of an alternative trough structure; and FIG. 7 is a sectional illustration taken substantially along section lines 7—7 of FIG. 6.

Referring to the drawings, the mill comprises a cluster (see FIGS. 1, 2 and 3) of relatively tall, concrete, cylindrical containers or housings 10. As seen in FIG. 3, there are four such containers arranged with their centers at the corners of an imaginary square, these containers being connected together by upright walls or partitions 12. Also connecting the containers 10 together and spaced from the walls 12 are upright, arcuate, concrete walls 14 which provide four auxiliary bins indicated by the reference numeral 16.

Immediately above the cluster as just described is centrally situated a turn-head distributor 18 of conventional construction, which distributor may take the form of an ordinary spout mounted on a swivel.

Extending from the distributor 18 are a plurality of pipes or spouts 20 which are indicated diagrammatically by the arrows in FIGS. 1 and 2. These spouts 20 are arranged to connect with respective delivery conduits 22, 24 and 26 situated inside the containers 10 as shown in diagrammatic form in FIG. 2 and in cross-section in FIG. 3. Similar conduits 28 are provided in the auxiliary bins 16, these conduits also being connected to respective ones of the spouts 20. The exact construction of these conduits will be described more fully hereinafter.

The structures of the different containers 10 are identical, and, this being true, a description of one will suffice for all. Each container is divided into a plurality of vertically spaced bins 30, 32 and 34 which are separated by inclined, parallel, trough-like partitions 36. These partitions extend diametrically across the container with the lowermost portions thereof being adjacent to the cluster center. This center or areaway, which is indicated by the reference numeral 38, is defined by the containers 10 and the connecting walls 12, three different spaced floors 40, 42 and 44 spanning this areaway 38 and being located adjacent to the respective bins 30, 32 and 34.

The construction of the individual trough-like partitions is shown in more detail in FIGS. 4 and 5. Two steel I-beams 46 spaced apart and parallel diametrally extend across the container inclined as shown in FIGS. 2 and 4. To the underside of these I-beams 46 is secured a bottom trough plate 48, this plate and the webs of the two I-beams providing a trough 47 of rectangular cross-section. Mounted on the upper flanges of the two I-beams 46 are a pair of upwardly inclined steel or the like plates 50 which extend to the wall of the container 10 to thereby seal off the adjoining bins. Preferably, the lower edges 52 of these plates 50 extend slightly inwardly of the inner edges of the I-beam flanges so as to provide an elongated opening which empties into the trough 47 formed by the bottom plate 48. Fitted to the underside of the plate edges 52 and in substantial alignment with the upper flanges of the two I-beams 46 is a plate 54 which is provided with a series of spaced openings 56. Superposed against the underside of this plate 54 is a second plate 58. This second plate 58 is held in place by means of two angle irons 60 which are secured to the webs of the I-beams 46, the plate 58 being slidable along these angle irons 60 and having a handle 62 which extends through the wall of the container 10. This plate 58 is also provided with a plurality of spaced openings 63 of substantially the same size as the upper plate openings 56. By moving the lower plate 58 longitudinally, the two openings 56 and 63 may be moved into registry, thereby providing an opening between the bin and the inclined trough 47. Together the plates 54 and 58 provide a gate which is operable to control the flow of material from the bin into the trough 47.

Situated immediately beneath the bottom plate 48, and preferably secured thereto, is an air pipe 64 having a plurality of upwardly disposed jet apertures 66 which open through the plate 48. By delivering air under pressure to this pipe 64, it is possible to agitate any feed material which might be contained in the trough 47. Alternatively, this pipe 64 may be situated inside the trough 47.

To the lower end of each of the troughs 47 is connected a section of vertical spouting indicated by the reference numeral 68. This spouting 68 extends downwardly in the central areaway 38 (see FIG. 2) to a feed-collecting or handling mechanism such as a scale or suitable receiving hopper 70. Each of the spouts 68 is preferably provided with a gate or metering device which controls the flow of material through the spout. Suitable rodding ports 72 are provided in the wall of the container 10 at an accessible height above the respective floors 40, 42, 44. These rodding ports are conventional and are used for the purpose of agitating material in the bins when bridging or packing prevents the free flow of material from the respective troughs 47 and spouts 68.

As seen in FIGS. 2 and 3, the delivery conduits 22, 24 and 26 extend from the uppermost end of the individual containers 10 axially downwardly along the container walls to the respective bins. The conduit 22 opens into the bin 34, the conduit 24 opens into the bin 32, and the conduit 26 empties into the bin 30. The lowest extremities of these conduits are terminated adjacent the uppermost portions of the respective bins, as seen in FIG. 2, the conduit 22 terminating just below the upper end of the partition 36, for example. By means of this conduit arrangement, it is possible to fill each bin completely, thereby utilizing to full advantage all of the space of the respective bins.

In operation, assuming first that only one kind of material is loaded into the various containers 10, the material is elevated from ground level to the turn-head distributor 18. This distributor is manipulated to direct the material into the various spouts 20 and conduits 22, 24, 26 and 28 until the various bins are filled. During this filling operation, the gate 54, 58 is closed so that no material may escape from the individual bins. Following this filling operation, when it is desired to dispense material from any particular bin for further processing in the mechanism 70, the handle 62 of the trough gate is pulled outwardly to bring the two trough openings 56 and 63 into complete or partial registry. Material in the particular bin thereupon flows into the trough 47 and gravitates downwardly through the spouting 68 into the hopper or scale 70. Should the material pack or bridge over in the bin thereupon stopping the free flow of material, suitable rods are inserted in the rodding ports 72 for the purpose of breaking the bridge and restarting the flow. Also, air under pressure introduced to the pipe 64 will produce agitating jets upwardly through the packed material, tending to break the bridge and to resume flow.

If it is desired to store and handle small quantities of different materials, such materials are individually elevated to the distributor head 18 and directed therefrom downwardly into a selected bin. Thus, each of the bins 30, 32 and 34 of the entire cluster of containers 10 might have a different material therein, which material may be dispensed in any suitable proportion into the hopper 70.

By dividing the individual containers 10 into vertically separated bins, it is possible to obtain the necessary flexibility of use required for smaller feed mill installations. At times, the entire cluster of containers 10 may be used for handling the same material, thereby providing a huge amount of storage space. On the other hand, at times it may be desirable to handle and dispense a variety of different materials, the individual bin arrangement making this possible.

Since it is the tendency of feed materials to pack or bridge over during the dispensing operation, it is necessary that the material be agitated sufficiently for breaking the bridge and to cause the gravitational flow to resume. Many different contrivances have been used for the purpose of breaking these bridges, but it is most desirable that no particular contrivance or mechanism be needed for this purpose. Such a mechanism obviously contributes to the cost of the installation and must undergo consistent maintenance in order to continue in operation. This invention, while it achieves the desired vertical spacing between bins which makes maximum use of the space afforded by the containers 10, also materially contributes against this bridging tendency without the need of any mechanical agitation whether it be by means of agitating mechanism or by rodding through the ports 72. While the ports 72 have been provided in this invention, it has been found that some materials cannot be prevented from packing or bridging; hence, the need for such rodding ports. However, for the majority of the materials little or no agitation is required.

This reduction in the tendency to bridge or pack is primarily due to the design of the inclined partitions 36 in the side plates 50. Ideally and hypothetically, if each bin had a vertically aligned discharge port equal in size to the bin itself, no bridging or packing would occur. By providing the inclined partitions 36, 50, this idealized construction is quite closely approached, the inclined plates 50 providing a gradual extension of the bin walls so as to provide, for all practical purposes, a discharge port or opening which is essentially the same size as the bin. Of course, since it is necessary to provide some constriction at the base of the trough for dispensing the material, the idealized, large-opening discharge port cannot be fully realized; however, once flow has been started from one of the bins 30, 32, 34, it is continuous for almost all of the different types of feeds.

It has been learned that the silos or storage containers for the feed material, such as containers 10, present little or no problem with respect to bridging or packing if the container is quite shallow. For the huge quantities of material stored and handled, the use of this shallow-container principle becomes prohibitive from both space and cost standpoints, since a suitably large number of such containers at considerable cost covering a large area of surface would be required. These cost and space factors are sharply reduced by increasing the height of the containers by many times, but such height presents the problem of bridging and packing as already explained. Thus, this invention is unique in that it solves the problems of space, cost and bridging by providing a plurality of superposed, shallow bins or hoppers which reduce bridging tendencies to a minimum while taking advantage of the reduced space and cost requirements.

While the jet nozzle 64 has been disclosed as being mounted on the underside of the respective trough plate 48, it may be alternatively mounted inside the trough 47 or on the webs of the I-beams 46 so as to direct the jet blasts laterally inwardly instead of upwardly as illustrated in the drawings. These lateral blasts might be preferred in some instances, since they effect substantial agitation of the material in the trough causing free flow of material therein and in turn free the hopper openings 56, 63 for receiving additional material from the hopper.

By arranging the containers 10 into a cluster as illustrated in FIG. 3, a closed areaway 38 is provided which may be divided into floor sections for gaining access to the individual bins. This permits ease of sampling the material as well as rodding to break down the bridges if they should occur.

The particular construction of the inclined partitions provides gravity flow from the individual bins and further provides free flow of material from the individual troughs 47, by reason of the fact that the size of these troughs 47 is larger than the openings 56, 63 from the individual bins.

The bin-partition-gate construction of this invention, in addition to providing the aforementioned advantages, also serves the most useful and essential purpose of maintaining uniformity of material which is dispensed from the bins. Some feed materials when stored in containers or bins tend to segregate according to particle size, this phenomenon being especially true when the material is ground. For example, one type of ground material tends to segregate into the larger and smaller sized particles, the smaller sized particles migrating toward the center of the bin while the larger particles for some reason tend to collect near the outer portions of the bin. When this segregation occurs, if the material is drawn from the lower, center portion of the bin, only the finer granular material will be dispensed first while the coarser material follows after the finer material becomes substantially exhausted. This results in inconsistency in the uniformity of the material dispensed from the bin; hence, if uniformity of the material is to be achieved, it is necessary to perform a mixing operation later.

This invention provides uniformity and consistency in the size of the material for the reason that the gate has a plurality of longitudinally-spaced openings which extend diametrally across the bin so that even though the material in the bin might segregate according to particle size, the various openings in the gate serve to mix the materials while they are being dispensed.

FIGS. 6 and 7 illustrate an alternative trough design which improves the uniformity of flow of the material along the entire length of the trough and further insures consistency in the size of the material dispensed from the trough outlet. With the arrangement of openings 56, 63 along the longitudinal extent of the trough as illustrated in FIGS. 4 and 5, it can happen that when the gate 58 is opened, thereby opening all of the hopper outlets 56, material may eventually flow through only a single one of the outlets 56, which prevents flow from any of the other outlets 56. This, of course, is not desired, since it increases the tendency of the material in the hopper to bridge-over as well as to segregate into masses of the same particle size. This difficulty is overcome by the modified trough structure as shown in FIGS. 6 and 7 wherein like numerals indicate like parts and numerals with letter suffixes represent the functionally equivalent parts. The relative positions of the two plates 54 and 58 in FIG. 5 are reversed in the modified structure of FIGS. 6 and 7, the slidable gate in FIGS. 6 and 7 being indicated by the reference numeral 58a and the hopper floor plate being indicated by the numeral 54a. The plate or gate 58a is slidably mounted on the floor plate 54a and is provided with a plurality of spaced openings 63a which may be moved into registry with the same number of spaced openings 56a in the floor plate 54a. When the gate 58a is moved to place the respective openings 56a and 63a in registry, material may flow from the hopper into the trough 47.

Inside the trough 47 are mounted a plurality of spaced baffle plates 74, 76 and 78, there being one baffle plate for each floor plate opening 56a. Each baffle plate is fixedly secured to the underside of the floor plate 54 adjacent to the lower edge of the respective opening 56a, each baffle plate extending part way across the trough 47 toward the bottom plate 48. As seen in FIG. 7, the baffle plates extend from side to side of the trough 47, being suitably secured at the opposite lateral edges to the webs of the two I-beams 46.

As seen in both FIGS. 6 and 7, the baffle plates 74, 76 and 78 are of different lengths (vertical dimension), the plate 78 being shortest, the plate 76 intermediate, and the plate 74 the longest. By means of this progressive arrangement of baffle plate lengths, restrictive openings as indicated by the letters "x," "y" and "z" are provided between the lower edge of the plates and the trough bottom 48. It is important that the uppermost (in the trough 47) opening $x$ be the smallest of all the others, with the openings $y$ and $z$ being progressively larger in a downward direction of the trough.

In operation, when the gate 58a is opened, that is, when the openings 56a and 63a are moved into registry, material from the hopper will flow through the openings into the trough 47. The material flowing into the uppermost trough openings 56a, 63a will encounter the baffle plate 74 and will pass thereunder through the restriction $x$. This material will slide down the trough 47 with a thickness dimension substantially equal to the distance between the bottom plate 48 and the lower edge of the baffle 74, this thickness being substantially less than the vertical dimension of the restriction $y$. This being true, the remaining opening between the baffle 76 and the upper surface of the material flowing from the restriction $x$ will be free to receive material flowing through next lower set of openings 56a, 63a which are adjacent to the baffle 76. The material flowing through the restriction $y$ is therefore a compositie of the materials flowing through the two upper sets of openings 56a, 63a.

The material emanating from the restriction $y$ will of course gravitate downwardly on the trough bottom 48 and will clear the bottom edge of the baffle 78 by a distance depending upon the difference in lengths between the two baffles 76 and 78. This clearance will receive material flowing through the openings 56a, 63a disposed adjacent to the baffle 78, the total material flowing from the restriction $z$ being therefore a composite of material flowing through all of the openings 56a, 63a above the baffle 78.

From the foregoing, it will now be apparent that by means of the baffle structure 74, 76, 78, free flow of materials through all of the openings 56a is assured. This still further reduces the tendency of material in the hopper to bridge over and additionally assures that the material dispensed from the trough outlet is a heterogeneous mixture of particle sizes. Further, this free flow of a consistent mixture of material, while minimizing the tendency of the material in the hopper to bridge over, accomplishes all these results without the air of any moving parts or equipment such as screw or chain conveyors. Initial construction and operating maintenance costs are thereby kept to a minimum without sacrificing either efficiency or reliability of operation.

In some installations, which are intended to be used with particular types of feed or the like materials, it is not necessary to use the baffle plates 74, 76 and 78; however, with materials which have a greater tendency to bridge over or pack, the baffle plates become important in reducing the bridging tendency as well as promoting a consistent and uniform gravitational flow of material from the individual troughs.

A further modification of the trough structure which utilizes the principle of operation provided by the baffle plates is the lateral staggering or offsetting of the hopper outlets 56 so that material is fed to different lateral portions of the trough 47. In this arrangement, the longitudinally spaced outlets 56 are laterally offset with respect to each other to promote flow without requiring the presence of baffle plates.

Materials which are intended to be used in this invention comprise feed ingredients such as ground grains, granular type meals (soy bean meals, cottonseed meal); flaky type materials such as bran; fibrous materials such as alfalfa; citrus pulp and beet pulp. Other materials, of course, may be used.

Summarizing briefly, while the mill design of this invention is especially adapted for the smaller feed mill installation, additional advantages are found in that all of the elements cooperate to promote flow of material from the particular bins to reduce the tendency of the material to bridge, and to provide a steady, continuous gravity feed of the material from the individual bins.

What is claimed is:

1. Feed-handling apparatus comprising an upright, hollow cylindrical housing of concrete, said housing having inner and outer walls, a plurality of vertically spaced bins in said housing, said bins being separated by substantially parallel troughlike partitions which are inclined, said bins having discharge outlets at the lower ends, respectively, of said partitions, said outlets being aligned axially of said housing; each partition comprising two spaced apart parallel arranged I-beams inclined diametrally across said housing, a bottom trough plate on the underside of said I-beams, said I-beams and said plate constituting the sides and bottom respectively of a trough, two upwardly inclined plates extending from the upper portions of said I-beams, respectively, to the wall of said housing thereby providing a hopper-like partition, the joinder of said plates with said I-beams defining a longitudinal opening into said trough which is smaller in width than said trough, a floor in said longitudinal opening having a series of spaced apertures, a gate slidably mounted on said floor for opening and closing said apertures, a plurality of delivery conduits axially extending along the inner wall of said housing on the side adjacent to the upper ends of said trough-like partitions, there being one delivery conduit for each bin, each conduit having a discharge opening adjacent the uppermost portion of the respective bin, a plurality of vertically arranged spouts connected to said discharge outlets, respectively, flow-metering devices connected in series with said spouts respectively for controlling the delivery of material therefrom, and a series of jets in said troughs for delivering air under pressure thereto for agitating material therein.

2. A plurality of the apparatuses of claim 1 arranged in a cluster around a central areaway, perimetral walls joining the housings together, bin defining walls spaced from said perimetral walls and joining said housings for providing a series of auxiliary bins, delivery conduits emptying into said auxiliary bins, said housings being positioned in said cluster to dispose the trough outlets inside said central areaway, and a plurality of vertically spaced floors in said areaway adjacent said bins for gaining access to the latter.

3. Feed-handling apparatus comprising an upright, hollow cylindrical housing of concrete, said housing having inner and outer walls, a plurality of vertically spaced bins in said housing, said bins being separated by substantially parallel trough-like partitions which are inclined, said bins having discharge outlets at the lower ends, respectively, of said partitions, said outlets being aligned axially of said housing; each partition comprising two spaced apart parallel arranged beams inclined diametrally across said housing, a bottom plate on the underside of said beams, said beams and plate respectively constituting the sides and bottom of a trough, a rim on the upper portion of each beam extending inwardly of said trough for providing a longitudinal opening having a width smaller than said trough, two inclined plates extending upwardly from said rims respectively to the housing wall, a floor in said longitudinal opening having a series of spaced apertures, a gate slidably mounted on said floor for opening and closing said apertures; a plurality of tubular delivery conduits axially extending along the inner will of said housing on the side adjacent to the upper ends of said trough-like partitions, there being one delivery conduit for each bin, each conduit having a discharge opening adjacent the uppermost portion of the respective bin; a plurality of vertically arranged spouts connected to said discharge outlets, respectively, flow-metering devices interposed in said spouts, respectively, for selectively controlling the delivery of material therefrom, and a series of jets in said troughs for delivering air under pressure thereto for agitating material therein.

4. Feed-handling apparatus comprising an upright, hollow cylindrical housing of concrete, said housing having inner and outer walls, a plurality of vertically spaced bins in said housing, said bins being separated by substantially parallel trough-like partitions which are inclined, said bins having discharge outlets at the lower ends, respectively, of said partitions, said outlets being aligned axially of said housing; each partition comprising two spaced apart parallel arranged beams inclined diametrally across said housing, a bottom plate on the underside of said beams thereby providing a trough, a rim on the upper portion of each beam extending inwardly of said trough for providing a longitudinal opening having a width smaller than said trough, two inclined plates extending upwardly from said rims respectively to the housing wall, a floor in said longitudinal opening having a series of spaced apertures, a gate slidably mounted on said floor for opening and closing said apertures; a plurality of tubular delivery conduits axially extending along the inner wall of said housing on the side adjacent to the upper ends of said trough-like partitions, there being one conduit for each bin, each conduit having a discharge opening adjacent to the uppermost portions of said bins respectively, and vertically arranged spouts connected to said discharge outlets, respectively.

5. Feed-handling apparatus comprising an upright, hollow cylindrical housing, said housing having inner and outer walls, a plurality of vertically spaced bins in said housing, said bins being separated by substantially parallel trough-like partitions which are diametrally inclined, said bins having discharge outlets at the lower ends, respectively, of said partitions, said outlets being aligned axially of said housing; each partition comprising an elongated trough inclined diametrally across said housing, the trough having an upwardly disposed longitudinally extending opening which is smaller in width than said trough, two inclined plates extending upwardly from the lateral edges, respectively, of said longitudinal opening to the housing wall, a gate having a plurality of individual openings, said gate being disposed between said longitudinal opening and the bin space defined by said plates; and a plurality of conduits axially extending along the inner wall of said housing on the side adjacent to the upper ends of said trough-like partitions, there being one conduit for each bin, each conduit having a discharge opening adjacent to the uppermost portions of said bins, respectively.

6. Feed-handling apparatus comprising an upright, hollow cylindrical housing, a plurality of vertically spaced bins in said housing, said bins being separated by substantially parallel trough-like partitions which are diametrally inclined, said bins having discharge outlets at the lower ends, respectively, of said partitions; each partition comprising an elongated trough inclined diametrally across said housing, the trough having an upwardly disposed longitudinally extending opening which is smaller in width than said trough, two inclined plates extending upwardly from the lateral edges, respectively, of said longitudinal opening to the housing wall, a gate separating said longitudinal opening from the bin space defined by said plates, conduit means in said housing for delivering material to the uppermost portions of said bins respectively, and vertical spouting operatively connected to said partition outlets for removing material from said bins.

7. Feed handling apparatus comprising an upright, hollow cylindrical housing of concrete, a plurality of vertically spaced bins in said housing, said bins being separated by substantially parallel trough-like partitions which are inclined, said bins having discharge outlets at the lower ends, respectively, of said partitions, said outlets being aligned axially of said housing; each partition comprising two spaced-apart parallel arranged I-beams inclined diametrally across said housing, a bottom trough plate on the underside of said I-beams, said I-beams and said plate constituting the sides and bottom respectively of a trough, two upwardly inclined plates extending from the upper portions of said I-beams, respectively, to the wall of said housing thereby providing a hopper-like partition, the joinder of said plates with said I-beams defining a longitudinal opening in said trough which is smaller in width than said trough, a floor in said longitudinal opening having a series of spaced apertures, a gate slidably mounted on the upper side of said floor and having a series of spaced openings registrable with said apertures, respectively, for opening and closing said apertures, and a series of spaced-apart baffle plates secured in each trough, there being one baffle plate for each floor aperture, each baffle plate being secured to the underside of said floor adjacent to the lower side of the respective aperture and extending from side to side and depending only part way across the trough toward the bottom plate for providing a space between the lower edge of the plate and said bottom plate, the plates in each trough being of progressively greater length from the lower end of the trough upwardly.

8. Feed-handling apparatus comprising an upright, hollow cylindrical housing of concrete, a plurality of vertically spaced bins in said housing, said bins being separated by substantially parallel trough-like partitions which are inclined, said bins having discharge outlets at the lower ends, respectively, of said partitions; each partition comprising two spaced apart parallel arranged beams inclined diametrally across said housing, a bottom plate on the underside of said beams, said beams and said plate constituting the sides and bottom respectively of a trough, a rim on the upper portion of each beam extending inwardly of said trough for providing a longitudinal opening having a width smaller than said trough, two inclined plates extending upwardly from said rims respectively to the housing wall, a floor in said longitudinal opening having a series of spaced apertures, a gate slidably mounted on the upper side of said floor and having a series of spaced openings registrable with said apertures, respectively, for opening and closing said apertures, and a series of spaced apart baffle plates secured in each trough, there being one baffle plate for each floor aperture, each baffle plate being secured to the underside of said floor adjacent to the lower side of the respective aperture and extending from side to side and depending only part way across the trough toward the bottom plate for providing a space between the lower edge of the plate and said bottom plate, the plates in each trough being of progressively greater length from the lower end of the trough upwardly.

9. Feed-handling apparatus comprising an upright, hollow cylindrical housing, a plurality of vertically spaced bins in said housing, said bins being separated by substantially parallel trough-like partitions which are diametrically inclined, said bins having discharge outlets at the lower ends, respectively, of said partitions; each partition comprising an elongated trough inclined diametrically across said housing, the trough having an upwardly disposed longitudinally extending opening which is smaller in width than said trough, two inclined plates extending upwardly from the lateral edges, respectively, of said longitudinal opening to the housing wall, a gate having a plurality of openings, said gate being disposed between said longitudinal opening and the bin space defined by said plates, and a plurality of spaced apart baffle plates fixedly secured in each trough, there being one baffle plate for each gate opening, each baffle plate being positioned adjacent to the lower side of its respective gate opening and extending only part way across the trough toward the bottom thereof for providing a space between the bottom edge of the baffle plate and the trough bottom, the plates progressively extending greater distances toward the trough bottom from the lower end of the trough upwardly.

10. For use in a feed mill, a gravity dispensing device comprising an inclined trough having a closed bottom and sides, an open top and an outlet at its lower end, a member having a plurality of apertures closing said top, a gate operatively mounted on said member for selectively closing and opening said apertures, and a plurality of spaced apart baffle plates fixedly secured in said trough, there being one baffle plate for each aperture, each baffle plate being positioned adjacent to the lower side of its respective aperture and extending only part way across the trough toward the bottom thereof for providing a space between the bottom edge of the baffle plate and the trough bottom, the plates progressively extending greater distances toward the trough bottom from the lower end of the trough upwardly.

11. Feed-handling apparatus comprising an upright, hollow cylindrical housing, a plurality of vertically spaced bins in said housing, said bins being separated by substantially parallel trough-like partitions which are diametrally inclined, said bins having discharge outlets at the lower ends, respectively, of said partitions; each partition comprising an elongated trough inclined diametrally across said housing, the trough having an upwardly disposed longitudinally extending opening which is smaller in width than said trough, two inclined plates extending upwardly from the lateral edges, respectively, of said longitudinal opening to the housing wall, a gate having a plurality of openings, said gate being disposed between said longitudinal opening and the bin space defined by said plates, and means for regulating the flow of material through each gate opening, said means including a series of spaced restrictions in said trough, there being one restriction between each adjacent pair of said gate openings, said destrictions being spaced upwardly from the trough bottom progressively greater distances from the upper end of the trough downwardly.

References Cited in the file of this patent

UNITED STATES PATENTS

| | | |
|---|---|---|
| 533,197 | Jaeger et al. | Jan. 29, 1895 |
| 867,962 | Finton | Oct. 15, 1907 |
| 1,022,772 | Clouston | Apr. 9, 1912 |
| 2,587,854 | Johnson | Mar. 4, 1952 |
| 2,717,725 | Bennett | Sept. 13, 1955 |